United States Patent
Jha

(10) Patent No.: US 11,077,959 B2
(45) Date of Patent: Aug. 3, 2021

(54) COMBINED FORWARD NAVIGATION AND ANTI-COLLISION LIGHT FOR AN AIRCRAFT AND AIRCRAFT COMPRISING THE SAME

(71) Applicant: Goodrich Lighting Systems GmbH, Lippstadt (DE)

(72) Inventor: Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/702,606

(22) Filed: Dec. 4, 2019

(65) Prior Publication Data

US 2020/0189766 A1 Jun. 18, 2020

(30) Foreign Application Priority Data

Dec. 17, 2018 (EP) ..................................... 18212985

(51) Int. Cl.
| | |
|---|---|
| *B64D 47/06* | (2006.01) |
| *B64D 47/04* | (2006.01) |
| *G08G 5/00* | (2006.01) |
| *G08G 5/04* | (2006.01) |

(52) U.S. Cl.
CPC .............. *B64D 47/06* (2013.01); *B64D 47/04* (2013.01); *G08G 5/0047* (2013.01); *G08G 5/045* (2013.01); *B64D 2203/00* (2013.01)

(58) Field of Classification Search
CPC .... B64D 2203/00; B64D 47/04; B64D 47/06; G08G 5/0047; G08G 5/045
See application file for complete search history.

(56) References Cited

U.S. PATENT DOCUMENTS

| | | |
|---|---|---|
| 5,905,441 A | 5/1999 | Klee |
| 6,963,293 B1 | 11/2005 | Rast |
| 7,040,786 B2 | 5/2006 | Ganzer et al. |

(Continued)

FOREIGN PATENT DOCUMENTS

| | | |
|---|---|---|
| DE | 202010002722 U1 | 7/2010 |
| DE | 202010002772 U1 | 7/2010 |

(Continued)

OTHER PUBLICATIONS

Extended European Search Report for International Application No. 18212985.8 dated May 6, 2019, 8 pages.

*Primary Examiner* — Tsion Tumebo
(74) *Attorney, Agent, or Firm* — Cantor Colburn LLP

(57) ABSTRACT

A combined forward navigation and anti-collision light for an aircraft includes a forward navigation light source; a first lens, arranged over the forward navigation light source, with the forward navigation light source and the first lens in operation generating a forward navigation light output; an anti-collision light source; a second lens, arranged over the anti-collision light source, with the anti-collision light source and the second lens in operation generating an anti-collision light output; and a mounting structure, to which the forward navigation light source, the first lens, the anti-collision light source, and the second lens are mounted, wherein the mounting structure provides a common mounting plane, with the forward navigation light source and the anti-collision light source being arranged on the common mounting plane.

14 Claims, 6 Drawing Sheets

(56) References Cited

U.S. PATENT DOCUMENTS

| | | | |
|---|---|---|---|
| 7,236,105 B2 | 6/2007 | Brenner et al. | |
| 7,414,546 B2 | 8/2008 | Singer et al. | |
| 7,712,931 B1* | 5/2010 | Smith | F21V 7/0091 |
| | | | 362/331 |
| 8,192,060 B2 | 6/2012 | Wilkinson et al. | |
| 8,801,241 B2 | 8/2014 | Peck et al. | |
| 8,851,707 B2 | 10/2014 | Peck | |
| 9,694,914 B2 | 7/2017 | Wise | |
| 9,963,245 B2 | 5/2018 | Jha et al. | |
| 10,362,657 B2* | 7/2019 | Hessling-Von Heimendahl | F21V 17/06 |
| 10,618,672 B2* | 4/2020 | Jha | B64D 47/06 |
| 2011/0019430 A1* | 1/2011 | Wilkinson | B64D 47/06 |
| | | | 362/470 |
| 2013/0107553 A1* | 5/2013 | Desai | B64D 47/06 |
| | | | 362/470 |
| 2015/0166197 A1* | 6/2015 | Jha | H05B 47/20 |
| | | | 362/470 |
| 2016/0046389 A1* | 2/2016 | Jha | F21V 5/048 |
| | | | 362/470 |
| 2018/0084620 A1* | 3/2018 | Klein | H05B 45/14 |
| 2018/0245766 A1 | 8/2018 | Mussetter | |
| 2019/0144132 A1* | 5/2019 | Jha | H05K 1/181 |
| | | | 362/470 |
| 2019/0291894 A1* | 9/2019 | Hessling-Von Heimendahl | B64D 47/06 |

FOREIGN PATENT DOCUMENTS

| | | | |
|---|---|---|---|
| EP | 2572990 A1 | 3/2013 | |
| EP | 2985228 A1 * | 2/2016 | F21V 5/048 |
| EP | 3095709 A1 | 11/2016 | |
| EP | 3181459 A1 | 6/2017 | |
| EP | 3284683 A1 * | 2/2018 | F21S 43/19 |
| EP | 3403935 A1 | 12/2018 | |

\* cited by examiner

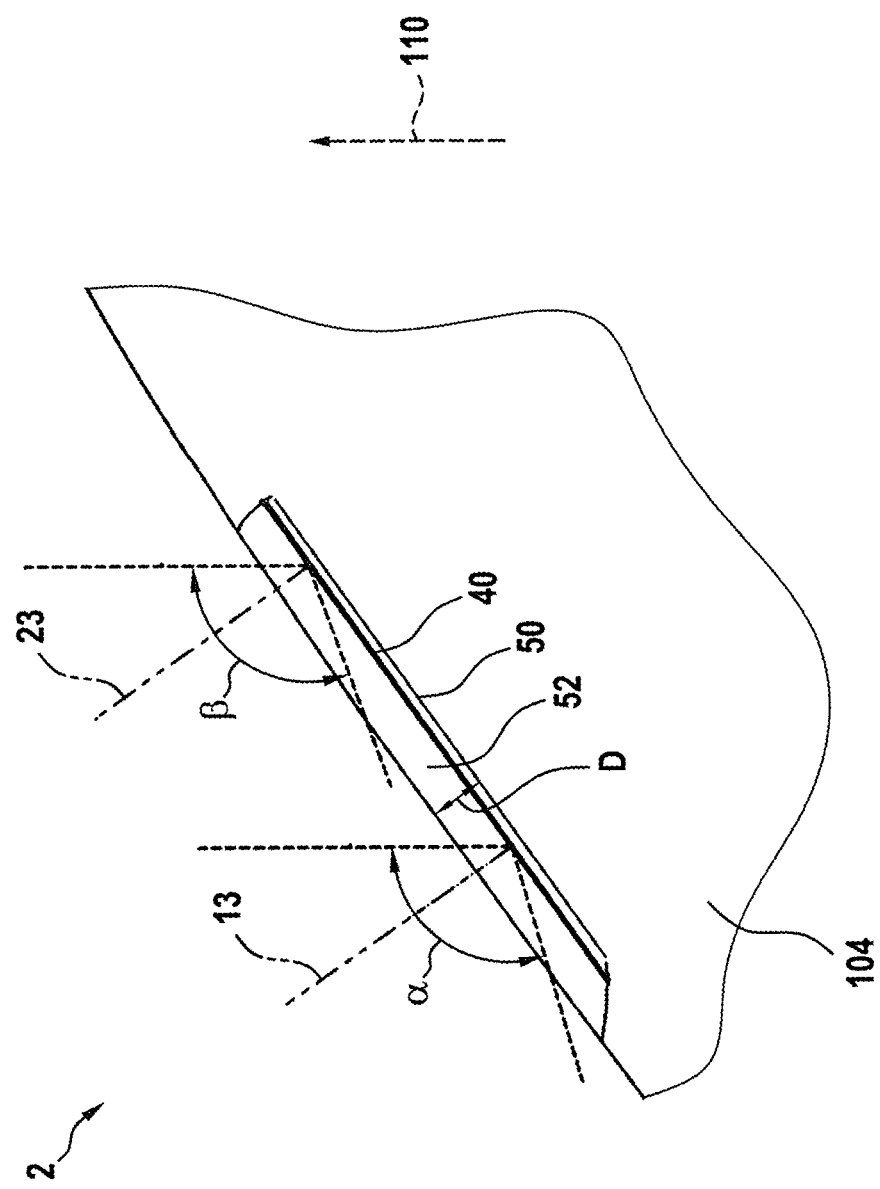

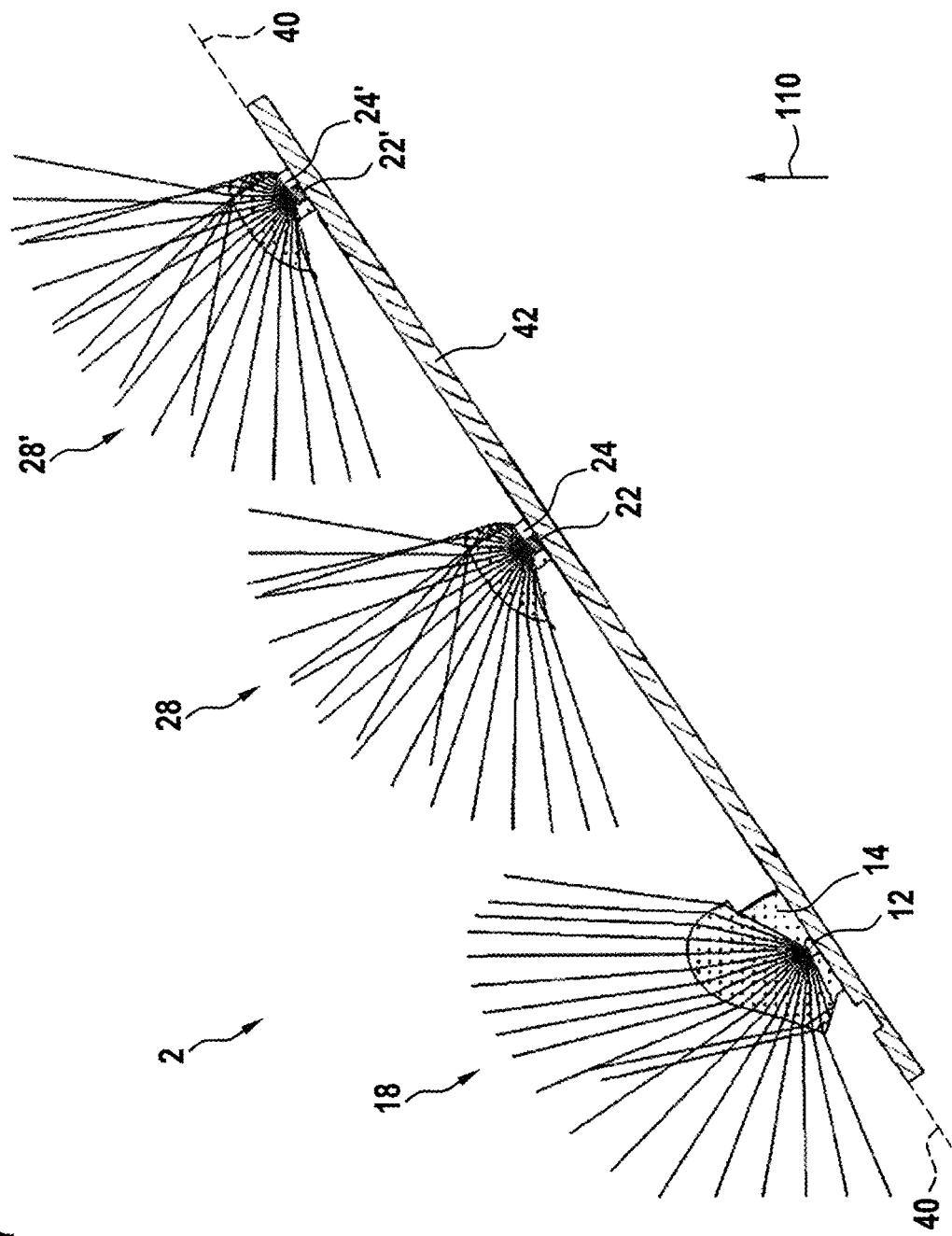

ature, the forward navigation light source, the first lens, the anti-collision light source, and the second lens may be smaller than the space envelope around above described separate, independently oriented structures of previous approaches. Said separate, independently oriented structures often have high space requirements due to the angled and/or offset arrangement of two extended mounting structures, which can be avoided by exemplary embodiments of the invention. Also, with the forward navigation light source and the anti-collision light source being arranged on the common mounting plane, the forward navigation light source, the anti-collision light source, and the first and second lenses may be arranged closer to the cover of the light than in previous approaches, which may again contribute to overall low space requirements. Further, with the forward navigation light source and the anti-collision light source being arranged on the common mounting plane, the control electronics, control lines, and power supply for the forward navigation lighting functionality and the anti-collision lighting functionality may be better integrated, which may again contribute to overall low space requirements.

COMBINED FORWARD NAVIGATION AND ANTI-COLLISION LIGHT FOR AN AIRCRAFT AND AIRCRAFT COMPRISING THE SAME

FOREIGN PRIORITY

This application claims priority to European Patent Application No. 18212985.8 filed Dec. 17, 2018, the entire contents of which is incorporated herein by reference.

BACKGROUND

The present invention relates to exterior aircraft lighting. In particular, it relates to those lights of an exterior aircraft lighting system that are arranged in the wings of an aircraft.

Almost all aircraft are equipped with exterior lighting systems. For example, large commercial aircraft have many different exterior lights. An exemplary group of exterior aircraft lights are lights for passive visibility, such as navigation lights, white strobe anti-collision lights, red flashing beacon lights and logo lights. Another exemplary group of exterior aircraft lights are headlights that allow the pilots to view the area in front of them, when they are seated in the cockpit, such as taxi lights, takeoff lights, landing lights, and runway turn-off lights. Yet another example of exterior aircraft lights are scan lights that allow the inspection of the aircraft structure in the dark, such as wing scan lights and engine scan lights.

Exterior aircraft lights require significant installation space. As space is a scarce resource in aircraft design, previous exterior aircraft lighting systems are not always satisfactory. Accordingly, it would be beneficial to provide an exterior aircraft light that has low space requirements for the functionality provided.

SUMMARY

Exemplary embodiments of the invention include a combined forward navigation and anti-collision light for an aircraft, comprising a forward navigation light source; a first lens, arranged over the forward navigation light source, with the forward navigation light source and the first lens in operation generating a forward navigation light output; an anti-collision light source; a second lens, arranged over the anti-collision light source, with the anti-collision light source and the second lens in operation generating an anti-collision light output; and a mounting structure, to which the forward navigation light source, the first lens, the anti-collision light source, and the second lens are mounted, wherein the mounting structure provides a common mounting plane, with the forward navigation light source and the anti-collision light source being arranged on the common mounting plane.

Exemplary embodiments of the invention allow for a space-saving integration of forward navigation lighting functionality and anti-collision lighting functionality in a single light unit. As compared to previous approaches where a forward navigation light source with an associated optical system and an anti-collision light source with an associated optical system were arranged as separate, independently oriented structures behind a common cover, the provision of the forward navigation light source and the anti-collision light source on the common mounting plane allow for a tighter integration of the forward navigation lighting functionality and the anti-collision lighting functionality. In particular, the space envelope around the mounting struc- The forward navigation light source and the first lens generate a forward navigation light output in operation of the combined forward navigation and anti-collision light. In particular, the forward navigation light output may satisfy the requirements for forward navigation lights as given in the Federal Aviation Regulations (FAR). Reference is made to FAR sections 25.1385 to 25.1397, as in force on the date of filing, which are incorporated herein by reference.

The anti-collision light source and the second lens generate an anti-collision light output in operation of the combined forward navigation and anti-collision light. In particular, the anti-collision light output may satisfy the requirements for anti-collision lights, as given in the Federal Aviation Regulations (FAR), over a portion of a 360° horizontal angle around the aircraft. Reference is made to FAR section 25.1401, as in force on the date of filing, which is incorporated herein by reference.

The first lens is arranged over the forward navigation light source. In other words, the forward navigation light source is arranged between the mounting structure and the first lens, with the forward navigation light source providing light emission towards the first lens. The first lens may be molded over the forward navigation light source. It may in particular be made from silicone molded onto the forward navigation light source.

The second lens is arranged over the anti-collision light source. In other words, the anti-collision light source is arranged between the mounting structure and the second lens, with the anti-collision light source providing light emission towards the second lens. The second lens may be molded over the anti-collision light source. It may in particular be made from silicone molded onto the anti-collision light source.

The first and second lenses are transparent or translucent structures, through which light from the forward navigation light source/anti-collision light source travels. The first and second lenses have optically active surfaces, such as refractive and/or reflective surfaces, for shaping the forward navigation light output/anti-collision light output from the light received from the light sources. The first and second lenses may have comparably complex, free-form shapes for shaping the forward navigation light output/anti-collision light output.

The combined forward navigation and anti-collision light may have further components for arranging it in the aircraft. For example, the combined forward navigation and anti-collision light may have a housing and a cover. The housing may have a shape to place the combined forward navigation and anti-collision light into a corresponding recess in the aircraft structure or to insert the combined forward navigation and anti-collision light through a corresponding opening in the aircraft outer shell. The cover may be shaped to blend into the aircraft outer shell. For example, the cover may blend into the wing shape of the aircraft. The cover is transparent or translucent, such that the forward navigation light output and the anti-collision light output are passed therethrough.

The combined forward navigation and anti-collision light may have a plurality of forward navigation light sources and/or a plurality of anti-collision light sources. It is possible that the plurality of forward navigation light sources and the plurality of anti-collision light sources are arranged on the common mounting plane. The first lens may be arranged over the plurality of forward navigation light sources or multiple first lenses may be provided for the plurality of forward navigation light sources. The second lens may be arranged over the plurality of anti-collision light sources or multiple second lenses may be provided for the plurality of anti-collision light sources. In general, it is possible that all forward navigation and anti-collision light sources of the combined forward navigation and anti-collision light, irrespective of their number, are arranged on the common mounting plane. It is further possible that the forward navigation light source and the anti-collision light source, discussed above, are the only two light sources of the combined forward navigation and anti-collision light that are related to the forward navigation and anti-collision lighting functionalities.

According to a further embodiment, the mounting structure comprises a common mounting board, to which the forward navigation light source and the anti-collision light source are mounted. In particular, the upper surface of the common mounting board or a plane parallel to the upper surface of the common mounting board may form the common mounting plane. In this way, the mounting structure inherently has a set-up that provides the common mounting plane. The common mounting plane may be provided without carefully positioning different mounting structure components with respect to each other.

According to a further embodiment, the common mounting board is a common printed circuit board. In this way, the power supply and control connections of the forward navigation light source and the anti-collision light source may be conveniently integrated into a single printed circuit board. The connections to the on-board power supply network and/or to the aircraft control lines can be bundled for the combined forward navigation and anti-collision lighting functionalities.

According to a further embodiment, the forward navigation light source comprises a first LED and the anti-collision light source comprises a second LED. Providing LEDs as light sources allows for providing a light having high energy-efficiency, high reliability, and low space requirements.

According to a further embodiment, the first LED has its main light emission direction orthogonal to the common mounting plane and the second LED has its main light emission direction orthogonal to the common mounting plane. Many LEDs have their main light emission direction orthogonal to their mounting base. Arranging the first and second LEDs in such a way that their main light emission directions are orthogonal to the common mounting plane allows for a convenient placement and highly robust attachment of the LEDs to the mounting structure.

According to a further embodiment, the anti-collision light output is asymmetric with respect to a straight out light emission plane of the anti-collision light source, orthogonal to the common mounting plane and extending through the anti-collision light source. As compared to previous approaches, where the anti-collision lights have a symmetric anti-collision light output both with respect to a horizontal cross-section and with respect to a vertical cross-section, the asymmetric anti-collision light output allows for a better integration with the forward navigation light output, when the light sources are arranged on a common mounting plane. In previous approaches, the anti-collision light source and the associated optical system were angled more outboard than the forward navigation light source and the associated optical system. With providing the asymmetric anti-collision light output with respect to the straight out light emission plane, the forward navigation light source and the anti-collision light source can be arranged on a common mounting plane, i.e. the forward navigation light source and the anti-collision light source can be arranged with the same outboard angle, and both the anti-collision light output and the forward navigation light output can be provided with high efficiency. The straight out light emission plane of the anti-collision light source is orthogonal to the common mounting plane. Further, the straight out light emission plane of the anti-collision light source is vertical. I.e., when the combined forward navigation and anti-collision light is in its operating position within the aircraft, the straight out light emission plane is a vertical plane through the anti-collision light source in the aircraft frame of reference.

According to a further embodiment, between 50% and 90%, in particular between 60% and 75%, of the anti-collision light output is on an outboard side of the straight out light emission plane of the anti-collision light source. Between 10% and 50%, in particular between 25% and 40%, of the anti-collision light output is on an inboard side of the straight out light emission plane of the anti-collision light source. The outboard side and the inboard side of the straight out light emission plane may also be referred to as first side and second side of the straight out light emission plane. Above percentage values may be percentage values of the luminous flux, emitted by the unit consisting of the anti-collision light source and the second lens. By providing above referenced portions of the anti-collision light output on the outboard side of the straight out light emission plane of the anti-collision light source, the anti-collision light output may be set up in a way that it provides the desired anti-collision lighting functionality over a horizontal opening angle that is similar to the horizontal opening angle of the forward navigation light output. The outboard-heavy, asymmetric anti-collision light output with respect to the straight out light emission plane allows for a good alignment of the forward navigation light output and the anti-collision light output and, thus, for an efficient provision of the forward navigation and anti-collision lighting functionalities from a common mounting plane.

According to a further embodiment, the first lens has a first total internal reflection surface positioned on an outboard side of a straight out light emission plane of the forward navigation light source, orthogonal to the common mounting plane and extending through the forward navigation light source, the first total internal reflection surface reflecting light towards the inboard side of the straight out light emission plane of the forward navigation light source. The light reflected by the first total internal reflection surface may be emitted to the inboard side of the straight out light emission plane of the forward navigation light source due to the total internal reflection alone or due to a combination of the total internal reflection and a further redirection by one or more other surfaces of the first lens, such as due to a combination of the total internal reflection at the first total internal reflection surface and an ensuing refraction upon leaving the first lens. The first total internal reflection surface allows for a strengthening of the light emission in or around the flight direction of the aircraft. This may allow for a larger outboard angle of the forward navigation light source and the first lens, as compared to the outboard angle of the forward navigation light source and the associated optical system of previous approaches. In this way, a favorable compromise for the outboard angle, i.e. the angle with respect to the flight direction of the aircraft, of the common mounting plane may be achieved, allowing for a highly efficient provision of both the forward navigation and anti-collision lighting functionalities. The straight out light emission plane of the forward navigation light source is orthogonal to the common mounting plane. Further, the straight out light emission plane of the forward navigation light source is vertical. I.e., when the combined forward navigation and anti-collision light is in its operating position within the aircraft, the straight out light emission plane is a vertical plane through the forward navigation light source in the aircraft frame of reference.

According to a further embodiment, the second lens has a second total internal reflection surface positioned on an inboard side of the straight out light emission plane of the anti-collision light source, the second total internal reflection surface reflecting light towards the outboard side of the straight out light emission plane of the anti-collision light source. The light reflected by the second total internal reflection surface may be emitted to the outboard side of the straight out light emission plane of the anti-collision light source due to the total internal reflection alone or due to a combination of the total internal reflection and a further redirection by one or more other surfaces of the second lens, such as due to a combination of the total internal reflection at the second total internal reflection surface and an ensuing refraction upon leaving the second lens. The second total internal reflection surface allows for a strengthening of the light emission far outboard of the flight direction of the aircraft. This may allow for a smaller outboard angle of the anti-collision light source and the second lens, as compared to the outboard angle of the anti-collision light source and the associated optical system of previous approaches. In this way, a favorable compromise for the outboard angle of the common mounting plane may be achieved, allowing for a highly efficient provision of both the forward navigation and anti-collision lighting functionalities.

According to a further embodiment, the first lens is symmetric with respect to a horizontal plane, orthogonal to the common mounting plane and extending through the forward navigation light source, and/or the second lens is symmetric with respect to a horizontal plane, orthogonal to the common mounting plane and extending through the anti-collision light source. In this way, the first lens and/or the second lens may provide for the same or similar illumination patterns in the lower hemisphere and the upper hemisphere of a horizontal plane extending through the aircraft. In this way, the lens design may address the symmetry of the FAR requirements with respect to the horizontal plane for both anti-collision lights and navigation lights in an efficient manner.

According to a further embodiment, the forward navigation light output is symmetric with respect to a horizontal plane, orthogonal to the common mounting plane and extending through the forward navigation light source, and/or the anti-collision light output is symmetric with respect to a horizontal plane, orthogonal to the common mounting plane and extending through the anti-collision light source.

According to a further embodiment, the common mounting plane is vertical. In other words, the combined forward navigation and anti-collision light may be configured to be arranged in an aircraft in such a way that the common mounting plane is vertical. Arranging the common mounting plane in a vertical manner provides for an ideal starting point for addressing the symmetry of the FAR requirements with respect to the horizontal plane for both anti-collision lights and navigation lights. With a vertical common mounting plane, no bias with respect to light emission towards the upper hemisphere or the lower hemisphere is introduced. However, it is pointed out that the common mounting plane does not have to be vertical. The common mounting plane may also be tilted from a vertical orientation, in particular tilted around a horizontal axis by less than 10°, further in particular by less than 5°.

According to a further embodiment, the forward navigation light output has a horizontal opening angle of between 110° and 130°, in particular of between 110° and 120°, and/or the anti-collision light output has a horizontal opening angle of between 100° and 140°, in particular of between 110° and 130°. The horizontal opening angles of the forward navigation light output and the anti-collision light output may be the same or similar, as specified by above angular value ranges. In this way, the combined forward navigation and anti-collision light may provide the desired forward navigation and anti-collision lighting functionalities/satisfy the requirements for forward navigation and anti-collision lighting over a substantial sector of the 360° horizontal angle around the aircraft. In particular, the combined forward navigation and anti-collision light may serve as the only forward navigation and anti-collision light in a given wing of an aircraft.

According to a further embodiment, the common mounting plane has an outboard angle of between 30° and 50°, in particular of between 35° and 45°, further in particular of between 35° and 40°, with respect to a flight direction of the aircraft. In other words, the combined forward navigation and anti-collision light may be configured to be arranged in an aircraft in such a way that the common mounting plane has an outboard angle of between 30° and 50°, in particular of between 35° and 45°, further in particular of between 35° and 40°, with respect to a flight direction of the aircraft. The given value ranges provide a good compromise between efficiently satisfying forward navigation lighting requirements and anti-collision lighting requirements. The given value ranges allow for the forward navigation light source and the first lens to emit a large amount of light in or around the flight direction in an efficient manner, while at the same time allowing for the anti-collision light source and the second lens to efficiently distribute the light from the anti-collision light source over an extended horizontal opening angle in a comparably even manner.

According to a further embodiment, the combined forward navigation and anti-collision light further comprises an end of life detector, arranged between the forward navigation light source and the anti-collision light source, and a third lens, arranged over the end of life detector, with the third lens directing light from the forward navigation light source and from the anti-collision light source towards the end of life detector. In this way, both the operational state and/or degradation of the forward navigation light source and the anti-collision light source can be checked via a single end of life detector. The third lens may be arranged directly adjacent to the first lens and/or to the second lens or may be spaced from the first lens and/or the second lens. It is also possible that the first, second, and third lenses are integrally formed.

According to a further embodiment, the anti-collision light output is one of a white strobe anti-collision light output and a red beacon anti-collision light output. In the case of a white strobe anti-collision light output, the anti-collision light output comprises a sequence of white light flashes. In the case of a red beacon anti-collision light output, the anti-collision light output comprises a sequence of red light flashes, in particular flashes of aviation red light, as defined in FAR section 25.1397. For providing the red beacon anti-collision light output, the anti-collision light source may be a red light source, such as a red LED, and/or the second lens may comprise a red light filter and/or a red light filter may be provided in addition to the anti-collision light source and the second lens.

According to a further embodiment, the combined forward navigation and anti-collision light comprises at least two anti-collision light sources and at least two second lenses, respectively arranged over the at least two anti-collision light sources, with one anti-collision light source and one second lens in operation generating a white strobe anti-collision light output and with another anti-collision light source and another second lens in operation generating a red beacon anti-collision light output. In other words, there may be provided a first set of an anti-collision light source and a second lens and a second set of an anti-collision light source and a second lens, with one of the first and second sets providing a white strobe anti-collision light output and the other one of the first and second sets providing a red beacon anti-collision light output. In this way, the combined forward navigation and anti-collision light may provide the three functionalities of a forward navigation light, a white strobe anti-collision light, and a red beacon anti-collision light. The at least two anti-collision light sources are arranged on the common mounting plane.

The forward navigation light output may be a red forward navigation light output or a green forward navigation light output. For achieving the desired light output color, the forward navigation light source may be a red or green light source, such as a red or green LED, and/or the first lens may comprise a red or green light filter and/or a red or green light filter may be provided in addition to the forward navigation light source and the first lens.

Exemplary embodiments of the invention further include an aircraft comprising a fuselage; a left wing; a right wing; a left combined forward navigation and anti-collision light in accordance with any of the embodiments described above, the left combined forward navigation and anti-collision light being arranged in the left wing; and a right combined forward navigation and anti-collision light in accordance with any of the embodiments described above, the right combined forward navigation and anti-collision light being arranged in the right wing. The forward navigation light output of the left combined forward navigation and anti-collision light is a red forward navigation light output. The forward navigation light output of the right combined forward navigation and anti-collision light is a red forward navigation light output. The additional features, modifications, and beneficial effects, described above with respect to the combined forward navigation and anti-collision light, apply to the aircraft in an analogous manner. The aircraft may be an air plane, in particular a large commercial air plane.

According to a further embodiment, the common mounting plane of the left combined forward navigation and anti-collision light is angled between 30° and 50°, in particular between 35° and 45°, further in particular between 35° and 40°, outboard to the left with respect to a flight direction of the aircraft, and the common mounting plane of the right combined forward navigation and anti-collision light is angled between 30° and 50°, in particular between 35° and 45°, further in particular between 35° and 40°, outboard to the right with respect to the flight direction of the aircraft.

BRIEF DESCRIPTION OF THE DRAWINGS

Further exemplary embodiments of the invention are described with respect to the accompanying drawings, wherein:

FIG. 6 shows a combined forward navigation and anti-collision light in accordance with an exemplary embodiment of the invention, arranged in a wing of an aircraft, in a highly schematic top view; and FIG. 7 shows selected components of a combined forward navigation and anti-collision light in accordance with an exemplary embodiment of the invention in a horizontal cross-sectional view.

DETAILED DESCRIPTION

Figure 1:
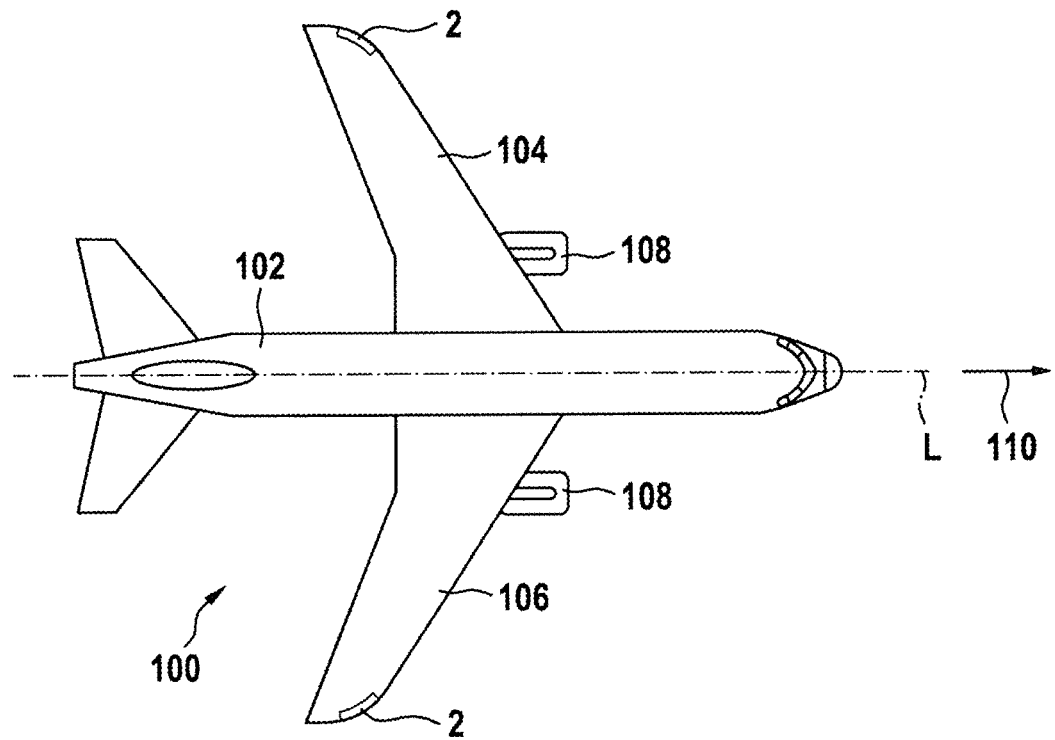
FIG. 1 shows a schematic top view of an aircraft in accordance with an exemplary embodiment of the invention, the aircraft being equipped with two combined forward navigation and anti-collision lights, arranged in the wings of the aircraft, in accordance with exemplary embodiments of the invention.

FIG. 1 shows a schematic top view of an aircraft 100, in particular an air plane 100, in accordance with an exemplary embodiment of the invention. The aircraft 100 comprises a fuselage 102, a left wing 104, and a right wing 106, the left and right wings 104, 106 extending laterally from the fuselage 102. An engine 108 is mounted to each of the wings 104, 106, respectively. The aircraft 100 is substantially symmetric with respect to its longitudinal axis L. A flight direction of the aircraft 100 is indicated at 110.

The aircraft 100 is equipped with two combined forward navigation and anti-collision lights 2, mounted to the wings 104, 106. The combined forward navigation and anti-collision lights 2 are in accordance with exemplary embodiments of the invention. In particular, the left wing 104 is equipped with a left combined forward navigation and anti-collision light 2 and the right wing 104 is equipped with a right combined forward navigation and anti-collision light 2. The combined forward navigation and anti-collision lights 2 are arranged in the respective wing tip portions of the left and right wings 104, 106. In particular, the combined forward navigation and anti-collision lights 2 are arranged substantially at the front/side edge of the wing tip portions of the left and right wings 104, 106.

In operation, the combined forward navigation and anti-collision lights 2 emit both a respective forward navigation light output and a respective anti-collision light output. The left combined forward navigation and anti-collision light 2 emits a red forward navigation light output, and the right combined forward navigation and anti-collision light 2 emits a left forward navigation light output. In the exemplary embodiment of FIG. 1, the anti-collision light output of both the left combined forward navigation and anti-collision light 2 and the right combined forward navigation and anti-collision light 2 is a white strobe anti-collision light output. It is also possible that both the left combined forward navigation and anti-collision light 2 and the right combined forward navigation and anti-collision light 2 emit a red beacon anti-collision light output in addition or as an alternative to the white strobe anti-collision light output.

Figure 2:
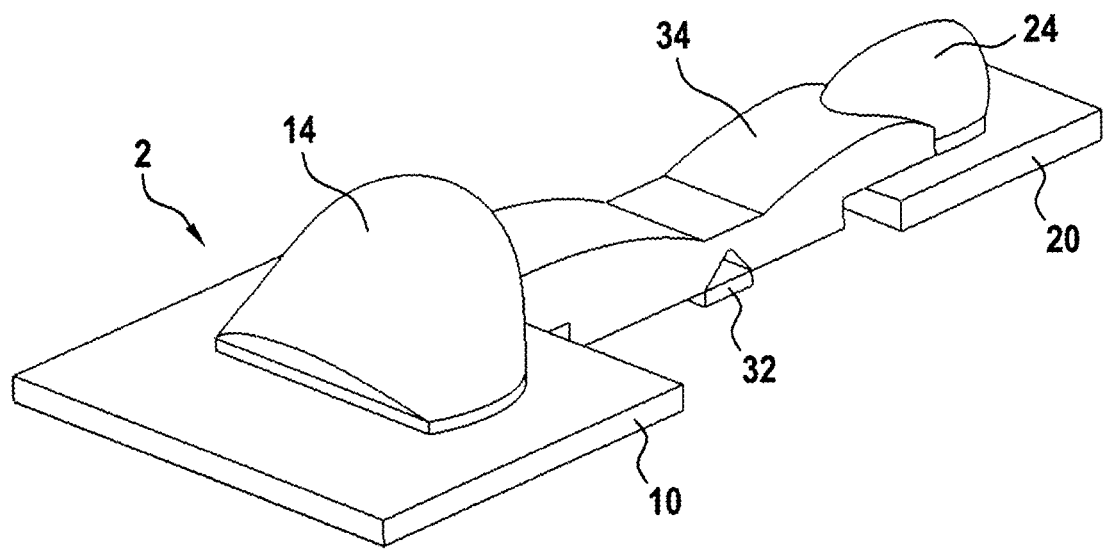
FIG. 2 shows selected components of a combined forward navigation and anti-collision light in accordance with an exemplary embodiment of the invention in a perspective view.

FIG. 2 shows selected components of a combined forward navigation and anti-collision light 2 in accordance with an exemplary embodiment of the invention in a perspective view. The combined forward navigation and anti-collision light 2 has a first mounting board 10, which is a first printed circuit board 10 in the exemplary embodiment of FIG. 2, to which a first lens 14 is mounted. A forward navigation light source is arranged between the first mounting board 10 and the first lens 14, with the forward navigation light source not being shown in FIG. 2. The combined forward navigation and anti-collision light 2 further has a second mounting board 20, which is a second printed circuit board 20 in the exemplary embodiment of FIG. 2, to which a second lens 24 is mounted. An anti-collision light source is arranged between the second mounting board 20 and the second lens 24, with the anti-collision light source not being shown in FIG. 2. The combined forward navigation and anti-collision light 2 further has an end of life detector, arranged between the first mounting board 10 and the second mounting board 20, and a third lens 34, arranged between the first lens 14 and the second lens 24.

The first mounting board 10 and the second mounting board 20 jointly form a mounting structure, to which the forward navigation light source, the first lens 14, the anti-collision light source and the second lens 24 are mounted. The mounting structure may further comprise a mounting base, to which the first mounting board 10 and the second mounting board 20 are coupled. The first mounting board 10 and the second mounting board 20 have a fixed position within the combined forward navigation and anti-collision light 2, either via said mounting base or via any other suitable structure for fixing the relative position between the first mounting board 10 and the second mounting board 20.

For clarity of illustration, further components of the combined forward navigation and anti-collision light 2, such as a housing, a transparent cover, and power supply and control electronics/connections, are not depicted in FIG. 2. It is understood that the combined forward navigation and anti-collision light 2 of FIG. 2 has such further components.

The combined forward navigation and anti-collision light 2 of FIG. 2 may be employed in the aircraft depicted in FIG. 1. In particular, depending on its orientation and the type of light sources and/or color filters used, the combined forward navigation and anti-collision light 2 of FIG. 2 may be employed both as the right combined forward navigation and anti-collision light or as the left combined forward navigation and anti-collision light in the aircraft of FIG. 1.

The optical properties and the operation of the combined forward navigation and anti-collision light 2 of FIG. 2 will be explained in detail below with respect to FIGS. 3A-3B, 4A-4B, and 5A-5B.

Figure 3A:
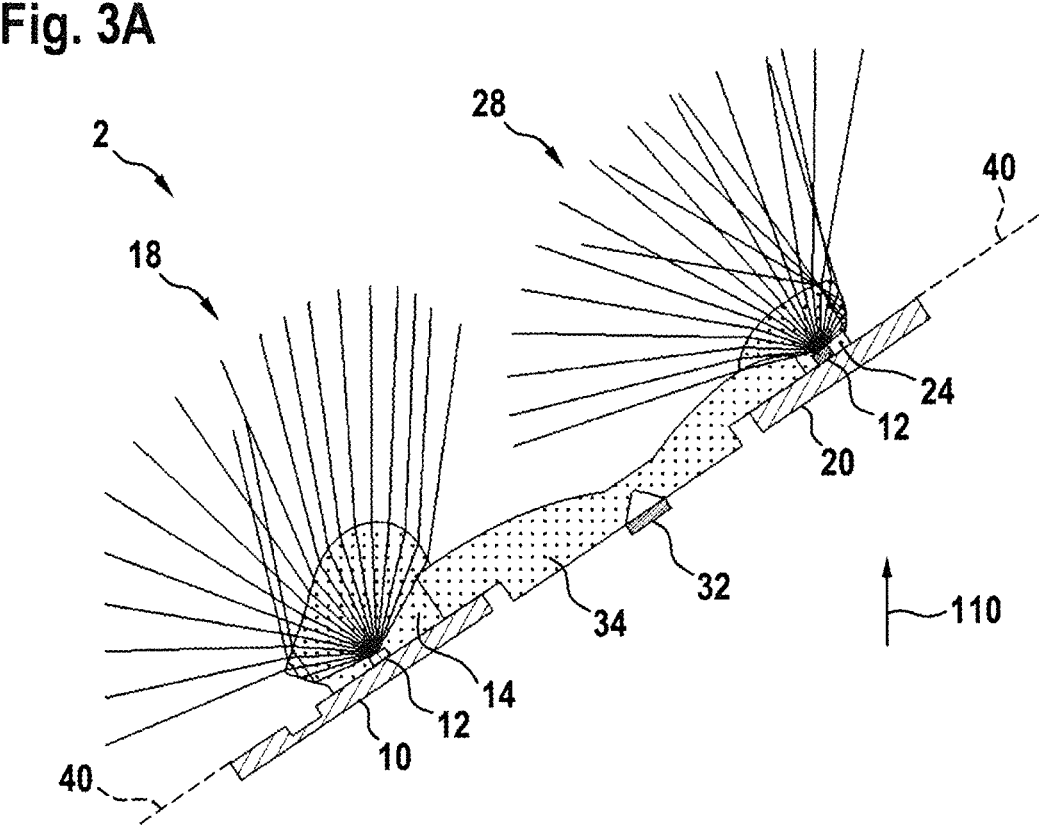
FIGS. 3A-3B show the selected components of the combined forward navigation and anti-collision light of FIG. 2 in a horizontal cross-sectional view.

FIG. 3A shows the combined forward navigation and anti-collision light 2 of FIG. 2 in a horizontal cross-sectional view. The horizontal cross-sectional plane is horizontal in the aircraft frame of reference, i.e. the depicted cross-sectional plane is horizontal when the combined forward navigation and anti-collision light 2 is in its operating position. The horizontal cross-sectional plane is orthogonal to the first mounting board 10 and the second mounting board 20, i.e. the first mounting board 10 and the second mounting board 20 are arranged vertically, when the combined forward navigation and anti-collision light 2 is in its operating position. The upper surfaces of the first mounting board 10 and the second mounting board 20 form a common mounting plane 40, which is also vertical and which is depicted as a dashed line in FIG. 2.

The common mounting plane 40 is angled about 35° outboard to the left with respect to the flight direction 110. In this way, the combined forward navigation and anti-collision light 2 of FIG. 3A is a left combined forward navigation and anti-collision light 2, which may be arranged in a wing tip portion of a left wing of an aircraft. It is pointed out that a mirror-symmetric version of the combined forward navigation and anti-collision light 2 of FIG. 3A may in principle be used for the right combined forward navigation and anti-collision light. While the general design may be the same, the color of the forward navigation light output needs adjustment, in order to emit the respectively required forward navigation light color for the right side. As long as the color switching is taken care of, the combined forward navigation and anti-collision light 2 of FIG. 3A may be simply flipped upside down and may then be used on the right side of the aircraft.

FIG. 3A depicts the first mounting board 10, the first lens 14, the second mounting board 20, the second lens 24, the end of life detector 32, and the third lens 34, shown in FIG. 2 in perspective view. The combined forward navigation and anti-collision light 2 further comprises a forward navigation light source 12, arranged between the first mounting board 10 and the first lens 14. In the exemplary embodiment of FIG. 3A, the forward navigation light source 12 is a red LED. The combined forward navigation and anti-collision light 2 further comprises an anti-collision light source 22, arranged between the second mounting board 20 and the second lens 24. In the exemplary embodiment of FIG. 3A, the anti-collision light source 22 is a white LED. The forward navigation light source 12 and the anti-collision light source 22 are arranged on the common mounting plane 40.

In operation, the forward navigation light source 12 and the first lens 14 generate a forward navigation light output 18, illustrated in FIG. 3A by various light rays. The forward navigation light output 18 has a high light intensity around the flight direction 110 of the aircraft and has a decreasing light intensity outboard therefrom. The details of the light conditioning of the first lens 14 will be described below with respect to FIG. 4. The forward navigation light output 18 is a continuous light output to the human observer. It satisfies the FAR requirements for forward navigation lights, also referred to as position lights in the FAR.

In operation, the anti-collision light source 22 and the second lens 24 generate an anti-collision light output 28, illustrated in FIG. 3A by various light rays. The anti-collision light output 28 has a more even light intensity distribution between the flight direction 110 and the far outboard region of the anti-collision light output 28. The details of the light conditioning of the second lens 24 will be described below with respect to FIG. 5. The anti-collision light output 28 is a flashing light output to the human observer. It satisfies the FAR requirements for anti-collision lights for a sector of the 360° horizontal angle around the aircraft.

Figure 3B:
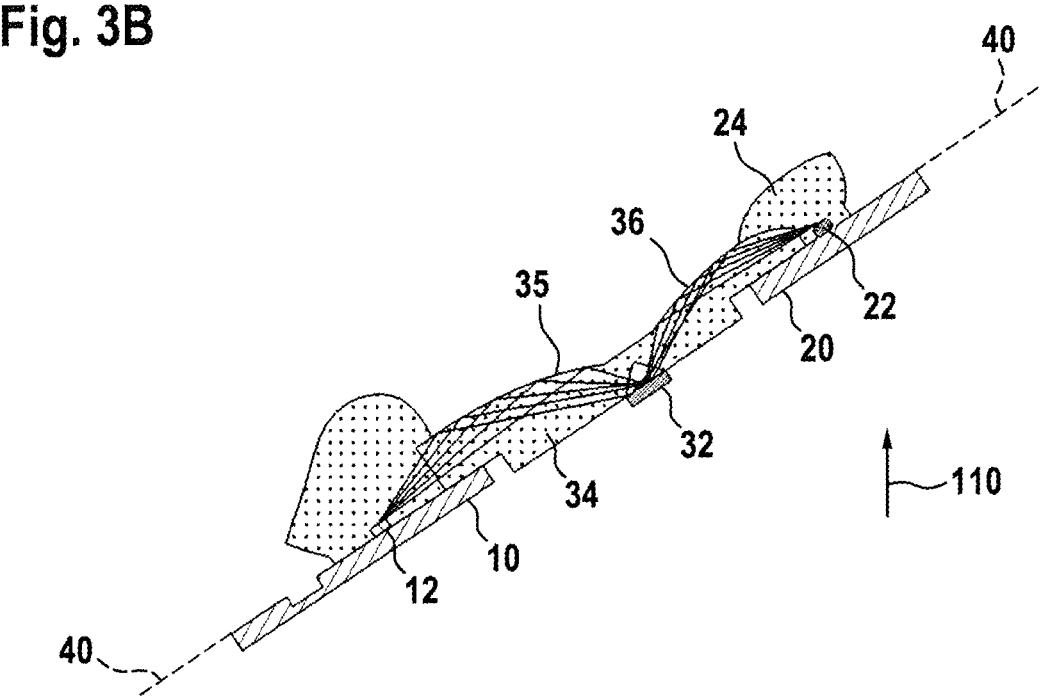

FIG. 3B shows the same components of the combined forward navigation and anti-collision light 2 as FIG. 3A in the same horizontal cross-sectional view. However, instead of illustrating the forward navigation light output 18 and the anti-collision light output 28, FIG. 3B illustrates the reception of light from the forward navigation light source 12 and from the anti-collision light source 22 by the end of life detector 32. For re-directing the light towards the end of life detector 32, the third lens 34 has a forward navigation light total internal reflection surface 35 and an anti-collision light total internal reflection surface 36. Upon leaving the first lens 14, a portion of the light from the forward navigation light source 12 enters the third lens 34, is reflected by the forward navigation light total internal reflection surface 35, and reaches the end of life detector 32, as illustrated by various light rays. Upon leaving the second lens 24, a portion of the light from the anti-collision light source 22 enters the third lens 34, is reflected by the anti-collision light total internal reflection surface 36, and reaches the end of life detector 32, as illustrated by various light rays.

On the basis of the light received from the forward navigation light source 12 and from the anti-collision light source 22, the end of life detector can determine a current light intensity level of the light sources. This information may be used to determine how much the light sources have degraded and if an end of life condition or a near end of life condition has been reached. Such an end of life/near end of life condition may be indicated, and the combined forward navigation and anti-collision light 2 may be scheduled for maintenance. The end of life detector 32 may determine the operating state of the forward navigation light source 12 and/or the anti-collision light source 22 during normal operation or during test operation. Such test operation may be carried out at regular maintenance intervals or at every power up of the combined forward navigation and anti-collision light 2 or at any other suitable points in time.

It is pointed out that the end of life detector 32 and the third lens 34 are optional components, which may also be omitted.

Figure 4A:
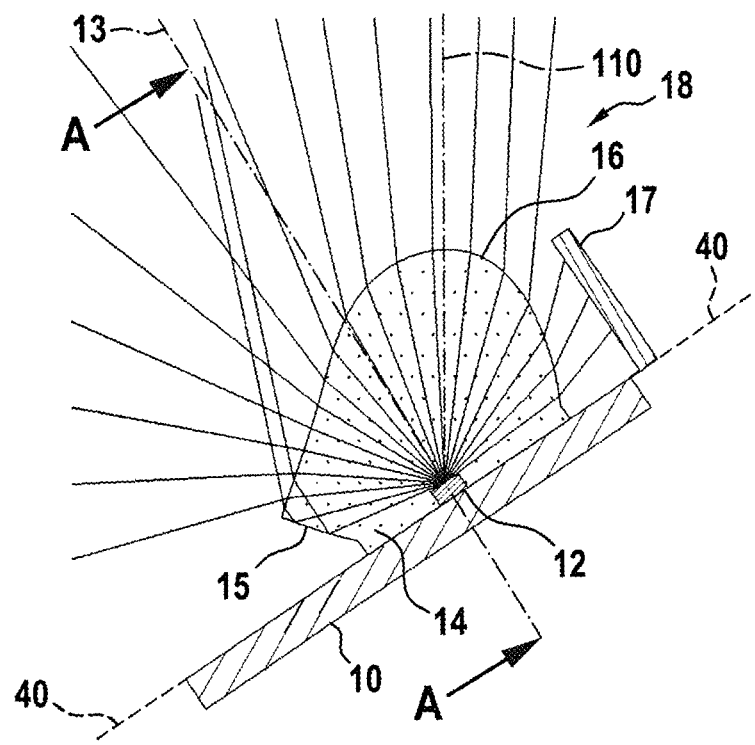
FIGS. 4A-4B shows selected components of a combined forward navigation and anti-collision light in accordance with an exemplary embodiment of the invention in a horizontal cross-sectional view and in a vertical cross-sectional view, the selected components being those components related to the forward navigation lighting functionality.

FIG. 4A depicts selected components of a combined forward navigation and anti-collision light in accordance with an exemplary embodiment of the invention in a horizontal cross-sectional view. In particular, FIG. 4A depicts those components of the combined forward navigation and anti-collision light that are involved in the generation of the forward navigation light output. The cross-sectional view of FIG. 4A is the same as the cross-sectional view of FIG. 3, and the combined forward navigation and anti-collision light of FIG. 4A has a first mounting board 10, a forward navigation light source 12, and a first lens 14 identical or very similar to the respective components of the combined forward navigation and anti-collision light 2 of FIGS. 2 and 3. Reference is made to above description of those components.

In the exemplary embodiment of FIG. 4A, no third lens is present. Instead, a shutter 17 is provided, which blocks that portion of light that is received by the third lens in the exemplary embodiment of FIGS. 2 and 3. The shutter 17 ensures that no red light from the forward navigation light source 12 is emitted to the right side of the aircraft, where green light is to be emitted in accordance with the regulations for aircraft navigation lights.

The light conditioning by the first lens 14 is described in more detail with respect to FIG. 4A. The light conditioning is described with respect to a main light emission direction 13 of the forward navigation light source 12, which is orthogonal to the first mounting board 10, and with respect to a straight out light emission plane, which is orthogonal to the first mounting board 10 and extends through the forward navigation light source 12 and contains the main light emission direction 13. The straight out light emission plane is a vertical plane and thus coincides with the main light emission direction 13 in the viewing direction of FIG. 4A. The main light emission direction 13 has an angle of about 35° with respect to the flight direction 110 of the aircraft, as has been described above with respect to FIG. 3 with respect to the common mounting plane 40. The flight direction 110 of the aircraft is inboard of the straight out light emission plane of the forward navigation light source 12.

The first lens 14 has a first total internal reflection surface 15 and a first refractive surface 16. Both the first total internal reflection surface 15 and the first refractive surface 16 are outer surfaces of the first lens 14. Part of the light from the forward navigation light source 12 is initially incident on the first total internal reflection surface 15 and part of the light from the forward navigation light source 12 is initially incident on the first refractive surface 16. The light initially incident on the first refractive surface 16 exits the first lens 14 at said first refractive surface 16, where all or most of the light experiences a refractive re-directing. The light initially incident on the first total internal reflection surface 15 is reflected back into the first lens 14 and exits the first lens 14 at the first refractive surface 16 as well. The first total internal reflection surface 15 and the first refractive surface 16 jointly extend along a 180° angle, as seen from the forward navigation light source 12, in the horizontal cross-sectional plane of FIG. 4A. The first total internal reflection surface 15 covers about 20° of said 180° angle, and the first refractive surface 16 covers about 160° of said 180° angle. The first total internal reflection surface 15 affects the most outboard part of the light leaving the forward navigation light source 12.

The light reflected by the first total internal reflection surface 15 and subsequently refracted by the first refractive surface 16 is re-directed around the flight direction 110 of the aircraft. Also, the first refractive surface re-directs a large amount of light around the flight direction 110 of the aircraft. In this way, a light intensity peak in or close to the flight direction 110 of the aircraft is achieved. The first lens 14 transforms the light intensity distribution of the forward navigation light source 12, which has its peak light intensity in the main light emission direction 13, into the forward navigation light output 18, which has its peak light intensity in or close to the flight direction 110 of the aircraft. Towards the outboard portions of the forward navigation light output 18, the light intensity gradually decreases. In this way, the FAR requirements for forward navigation lights are satisfied in a highly efficient manner despite the fact that the first mounting board 10 is angled more outboard than in previous approaches for forward navigation lights.

Figure 4B:
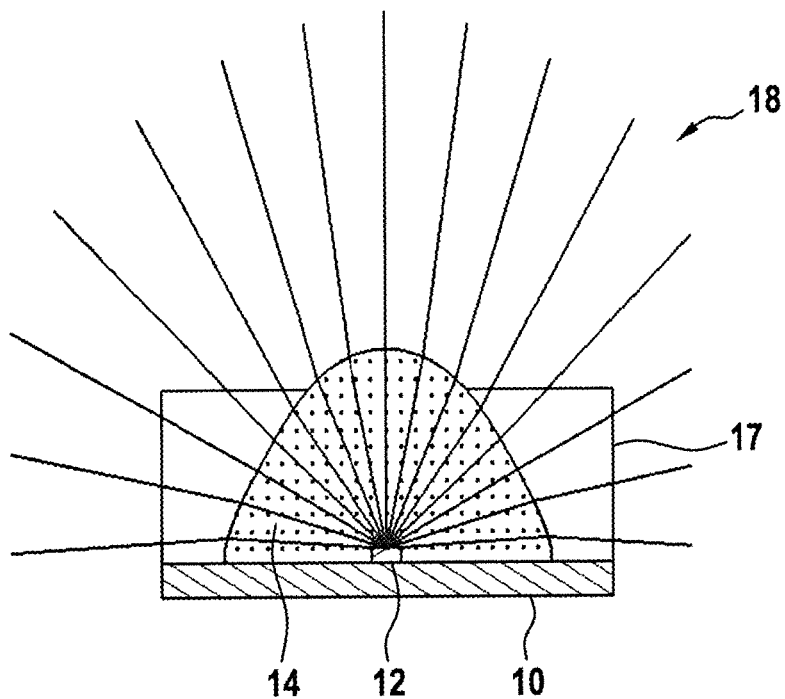

FIG. 4B shows the components of FIG. 4A in a vertical cross-sectional plane. The vertical cross-sectional plane of FIG. 4B is the straight out light emission plane of the forward navigation light source 12. The viewing direction is indicated with A-A in FIG. 4A. It is illustrated in FIG. 4B that the first lens 14 and the forward navigation light output 18 are symmetric with respect to the horizontal cross-sectional plane of FIG. 4A. In this way, the forward navigation light output 18 is emitted in the same or almost the same manner into the lower hemisphere below the aircraft and into the upper hemisphere above the aircraft.

Figure 5A:
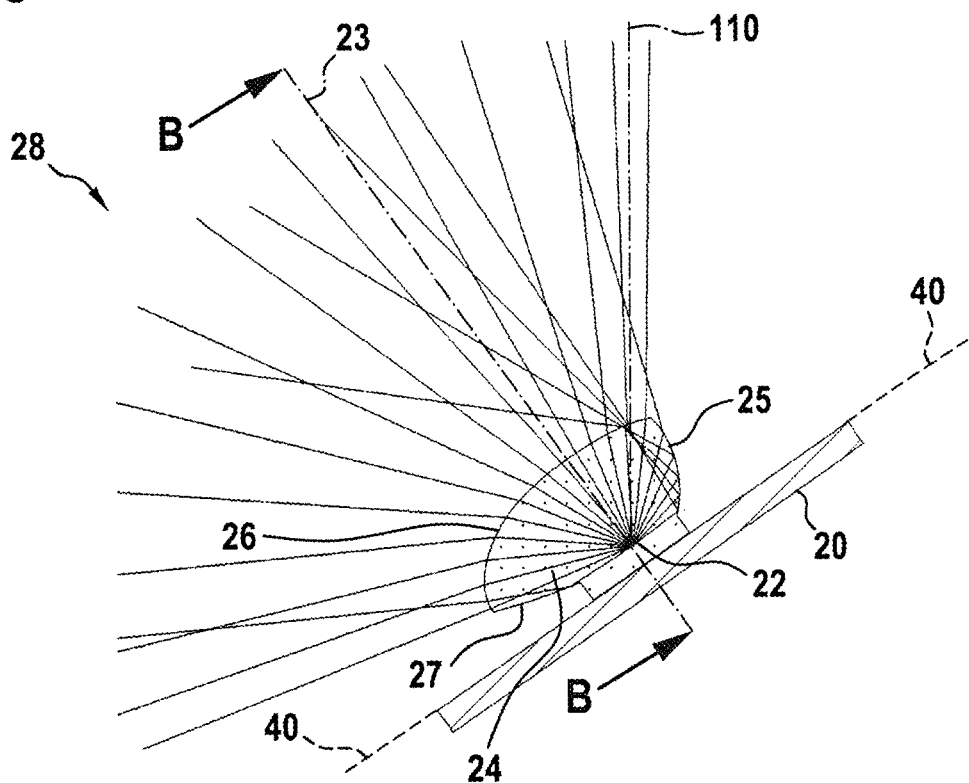
FIGS. 5A-5B shows selected components of a combined forward navigation and anti-collision light in accordance with an exemplary embodiment of the invention in a horizontal cross-sectional view and in a vertical cross-sectional view, the selected components being those components related to the anti-collision lighting functionality.

FIG. 5A depicts selected components of a combined forward navigation and anti-collision light in accordance with an exemplary embodiment of the invention in a horizontal cross-sectional view. In particular, FIG. 5A depicts those components of the combined forward navigation and anti-collision light that are involved in the generation of the anti-collision light output. The cross-sectional view of FIG. 5A is the same as the cross-sectional view of FIG. 3, and the combined forward navigation and anti-collision light of FIG. 5A has a second mounting board 20, an anti-collision light source 22, and a second lens 24 identical or very similar to the respective components of the combined forward navigation and anti-collision light 2 of FIGS. 2 and 3. Reference is made to above description of those components.

The light conditioning by the second lens 24 is described in more detail with respect to FIG. 5A. The light conditioning is described with respect to a main light emission direction 23 of the anti-collision light source 22, which is orthogonal to the second mounting board 20, and with respect to a straight out light emission plane, which is orthogonal to the second mounting board 20 and extends through the anti-collision light source 22 and contains the main light emission direction 23. The straight out light emission plane is a vertical plane and thus coincides with the main light emission direction 23 in the viewing direction of FIG. 5A. The main light emission direction 23 has an angle of about 35° with respect to the flight direction 110 of the aircraft, as has been described above with respect to FIG. 3 with respect to the common mounting plane 40. The flight direction 110 of the aircraft is inboard of the straight out light emission plane of the anti-collision light source 22.

The second lens 24 has a second total internal reflection surface 25, a second refractive surface 26, and a third total internal reflection surface 27. All of the second total internal reflection surface 25, the second refractive surface 26, and the third total internal reflection surface are outer surfaces of the second lens 24. Part of the light from the anti-collision light source 22 is initially incident on the second and third total internal reflection surfaces 25, 27 and part of the light from the anti-collision light source 22 is initially incident on the second refractive surface 26. The light initially incident on the second refractive surface 26 exits the second lens 24 at said second refractive surface 26, where all or most of the light experiences a refractive re-directing. The light initially incident on the second and third total internal reflection surfaces 25, 27 is reflected back into the second lens 24 and exits the second lens 24 at the second refractive surface 26 as well. The second total internal reflection surface 25, the second refractive surface 26, and the third total internal reflection surface 27 jointly extend along a 180° angle, as seen from the anti-collision light source 22, in the horizontal cross-sectional plane of FIG. 5A. The second total internal reflection surface 25 covers about 50° of said 180° angle, the second refractive surface 26 covers about 120° of said 180° angle, and the third total internal reflection surface 27 covers about 10° of said 180° angle. The second total internal reflection surface 25 affects the most inboard part of the light leaving the anti-collision light source 22, and the third total internal reflection surface 27 affects the most outboard part of the light leaving the anti-collision light source 22.

The light reflected by the second total internal reflection surface 25 and subsequently refracted by the second refractive surface 26 is spread between the flight direction 110 of the aircraft and a 90° outboard direction. The light initially incident on the second refractive surface 26 is spread between the flight direction 110 of the aircraft and a 115° outboard direction. In this way, a comparably even light intensity distribution across a large horizontal opening angle is achieved. The second lens 24 transforms the light intensity distribution of the anti-collision light source 22, which has its peak light intensity in the main light emission direction 23, into the anti-collision light output 28, which has a more even light intensity distribution across a horizontal opening angle of more than 110°. In this way, the FAR requirements for anti-collision lights are satisfied in a highly efficient manner over a horizontal opening angle of more than 110° despite the fact that the second mounting board 20 is angled more inboard than in previous approaches for anti-collision lights.

Figure 5B:
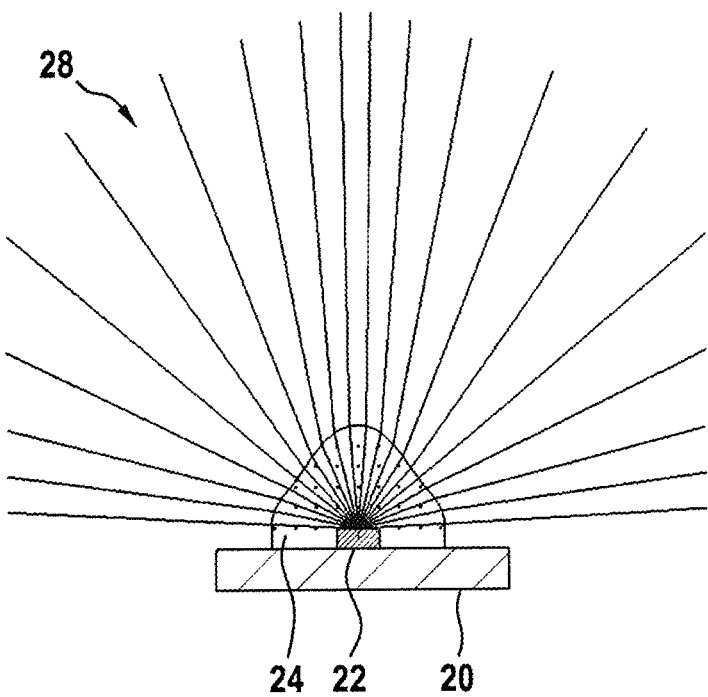

FIG. 5B shows the components of FIG. 5A in a vertical cross-sectional plane. The vertical cross-sectional plane of FIG. 5B is the straight out light emission plane of the anti-collision light source 22. The viewing direction is indicated with B-B in FIG. 5A. It is illustrated in FIG. 5B that the second lens 24 and the anti-collision light output 28 are symmetric with respect to the horizontal cross-sectional plane of FIG. 5A. In this way, the anti-collision light output 28 is emitted in the same or almost the same manner into the lower hemisphere below the aircraft and into the upper hemisphere above the aircraft.

FIG. 6 shows a combined forward navigation and anti-collision light 2 in accordance with an exemplary embodiment of the invention, arranged in a left wing 104 of an aircraft, in a highly schematic top view. The combined forward navigation and anti-collision light 2 has a housing 50 and a transparent cover 52. The housing 50 and the transparent cover 52 form an inner space, in which the components described above with respect to FIGS. 2 to 5 may be arranged. The components related to the forward navigation lighting functionality are highly schematically indicated by the main light emission direction 13 of the forward navigation light source and the horizontal opening angle α of the forward navigation light output. The horizontal opening angle α is 110° in the exemplary embodiment of FIG. 6. The components related to the anti-collision lighting functionality are highly schematically indicated by the main light emission direction 23 of the anti-collision light source and the horizontal opening angle β of the anti-collision light output. The horizontal opening angle β is 120° in the exemplary embodiment of FIG. 6.

As described above in detail, the forward navigation light source and the anti-collision light source are arranged on the common mounting plane 40. By providing the common mounting plane 40 and by arranging the forward navigation light source and the anti-collision light source thereon, a distance D between the bottom of the housing 50 and the front edge of the cover 52 can be kept small. The overall space requirements of the combined forward navigation and anti-collision light 2 are small.

FIG. 7 shows a combined forward navigation and anti-collision light 2 in accordance with an exemplary embodiment of the invention in a horizontal cross-sectional plane. The horizontal cross-sectional plane is the same cross-sectional plane as shown in FIG. 3. Also, the forward navigation light source 12, the first lens 14, the anti-collision light source 22, and the second lens 24 are identical or very similar to the respective components of the combined forward navigation and anti-collision light of FIG. 3. Further, the forward navigation light output 18 and the anti-collision light output 28 are identical to the respective light outputs of the combined forward navigation and anti-collision light of FIG. 3. I.e., the forward navigation light output 18 is a red forward navigation light output and the anti-collision light output 28 is a white strobe anti-collision light output. In the exemplary embodiment of FIG. 7, the forward navigation light source 12 and the anti-collision light source 22 are arranged on a common mounting board 42, which is a single printed circuit board 42 in the exemplary embodiment of FIG. 7. The upper surface of the common mounting board 42 is the common mounting plane 40.

The combined forward navigation and anti-collision light of FIG. 7 additionally comprises a further anti-collision light source 22' and a further second lens 24'. The further anti-collision light source 22' is a red LED. The further second lens 24' is arranged over the further anti-collision light source 22' and has the same shape as the second lens 24. The further anti-collision light source 22' is arranged on the common mounting board 42. It is arranged on the common mounting plane 40. The further second lens 24' is arranged over the further anti-collision light source 22'.

The further anti-collision light source 22' and the further second lens 24' in operation generate a further anti-collision light output 28', namely a red beacon anti-collision light output 28'. The red beacon anti-collision light output 28' comprises a sequence of red light flashes. In this way, the combined forward navigation and anti-collision light 2 of FIG. 7 provides for all three of a forward navigation lighting functionality, a white strobe anti-collision lighting functionality, and a red beacon anti-collision lighting functionality.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A combined forward navigation and anti-collision light for an aircraft, comprising:
   a forward navigation light source;
   a first lens, arranged over the forward navigation light source, with the forward navigation light source and the first lens in operation generating a forward navigation light output;
   an anti-collision light source;
   a second lens, arranged over the anti-collision light source, with the anti-collision light source and the second lens in operation generating an anti-collision light output;
   a mounting structure, to which the forward navigation light source, the first lens, the anti-collision light source, and the second lens are mounted;
   wherein the mounting structure provides a common mounting plane, with the forward navigation light source and the anti-collision light source being arranged on the common mounting plane;
   an end of life detector, arranged between the forward navigation light source and the anti-collision light source; and
   a third lens, arranged over the end of life detector, with the third lens directing light from the forward navigation light source and from the anti-collision light source towards the end of life detector.

2. A combined forward navigation and anti-collision light according to claim 1, wherein the mounting structure comprises a common mounting board, in particular a common printed circuit board, to which the forward navigation light source and the anti-collision light source are mounted.

3. A combined forward navigation and anti-collision light according to claim 1, wherein the forward navigation light source comprises a first LED, having its main light emission direction orthogonal to the common mounting plane, and wherein the anti-collision light source comprises a second LED, having its main light emission direction orthogonal to the common mounting plane.

4. A combined forward navigation and anti-collision light according to claim 1, wherein the anti-collision light output is asymmetric with respect to a straight out light emission plane of the anti-collision light source, orthogonal to the common mounting plane and extending through the anti-collision light source.

5. A combined forward navigation and anti-collision light according to claim 4, wherein between 50% and 90% of the anti-collision light output is on an outboard side of the straight out light emission plane of the anti-collision light source.

6. A combined forward navigation and anti-collision light according to claim 1, wherein the first lens has a first total internal reflection surface positioned on an outboard side of a straight out light emission plane of the forward navigation light source, orthogonal to the common mounting plane and extending through the forward navigation light source, the first total internal reflection surface reflecting light towards the inboard side of the straight out light emission plane of the forward navigation light source.

7. A combined forward navigation and anti-collision light according to claim 1, wherein the second lens has a second total internal reflection surface positioned on an inboard side of the straight out light emission plane of the anti-collision light source, the second total internal reflection surface reflecting light towards the outboard side of the straight out light emission plane of the anti-collision light source.

8. A combined forward navigation and anti-collision light according to claim 1,
   wherein the first lens is symmetric with respect to a horizontal plane, orthogonal to the common mounting plane and extending through the forward navigation light source, or
   wherein the second lens is symmetric with respect to a horizontal plane, orthogonal to the common mounting plane and extending through the anti-collision light source.

9. A combined forward navigation and anti-collision light according to claim 1, wherein the common mounting plane is vertical.

10. A combined forward navigation and anti-collision light according to claim 1,
   wherein the forward navigation light output has a horizontal opening angle ($\alpha$) of between 110° and 130° and wherein the anti-collision light output has a horizontal opening angle (β) of between 100° and 140.

11. A combined forward navigation and anti-collision light according to claim 1, wherein the common mounting plane has an outboard angle of between 30° and 50°, with respect to a flight direction of the aircraft.

12. A combined forward navigation and anti-collision light according to claim 1, comprising at least two anti-collision light sources and at least two second lenses, respectively arranged over the at least two anti-collision light sources, with one anti-collision light source and one second lens in operation generating a white strobe anti-collision light output and with another anti-collision light source and another second lens in operation generating a red beacon anti-collision light output.

13. An Aircraft comprising:
a fuselage,
a left wing,
a right wing,
a left light that is a combined forward navigation and anti-collision light in accordance with claim 1, the left light being arranged in the left wing, and
a right light that is a combined forward navigation and anti-collision light in accordance with claim 1, the right light being arranged in the right wing.

14. An aircraft according to claim 13,
wherein the common mounting plane of the left light is angled between 30° and 50° outboard to the left with respect to a flight direction of the aircraft, and
wherein the common mounting plane of the right light is angled between 30° and 50° outboard to the right with respect to the flight direction of the aircraft.

* * * * *